US008954092B2

United States Patent
Kirmse et al.

(10) Patent No.: US 8,954,092 B2
(45) Date of Patent: Feb. 10, 2015

(54) PRE-CACHING DATA RELATED TO A TRAVEL DESTINATION

(71) Applicants: Andrew Kirmse, Redwood City, CA (US); Dale Hawkins, Erie, CO (US); Ronghui Zhu, Sunnyvale, CA (US)

(72) Inventors: Andrew Kirmse, Redwood City, CA (US); Dale Hawkins, Erie, CO (US); Ronghui Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/657,519

(22) Filed: Oct. 22, 2012

(65) Prior Publication Data

US 2013/0344896 A1 Dec. 26, 2013

Related U.S. Application Data

(60) Provisional application No. 61/664,135, filed on Jun. 25, 2012.

(51) Int. Cl.
*H04W 24/00* (2009.01)

(52) U.S. Cl.
USPC ........ 455/456.3; 455/419; 707/600; 707/755; 707/771

(58) Field of Classification Search
None
See application file for complete search history.

(56) References Cited

U.S. PATENT DOCUMENTS

| | | | |
|---|---|---|---|
| 7,818,117 B2 * | 10/2010 | Nath | 701/439 |
| 2004/0044674 A1 * | 3/2004 | Mohammadioun et al. | 707/100 |
| 2004/0260461 A1 | 12/2004 | Sato et al. | |
| 2005/0283731 A1 * | 12/2005 | Saint-Hilaire et al. | 715/733 |
| 2006/0080032 A1 * | 4/2006 | Cooper et al. | 701/208 |
| 2007/0100651 A1 | 5/2007 | Ramer et al. | |
| 2008/0021748 A1 * | 1/2008 | Bay et al. | 705/6 |
| 2008/0062881 A1 * | 3/2008 | Martin et al. | 370/238 |
| 2008/0065633 A1 * | 3/2008 | Luo et al. | 707/6 |
| 2008/0085724 A1 | 4/2008 | Cormier et al. | |
| 2009/0248420 A1 | 10/2009 | Basir et al. | |
| 2009/0248807 A1 * | 10/2009 | Fron et al. | 709/206 |
| 2009/0282342 A1 * | 11/2009 | Fabris et al. | 715/733 |
| 2009/0292799 A1 * | 11/2009 | Eisener et al. | 709/223 |
| 2012/0124615 A1 * | 5/2012 | Lee | 725/30 |
| 2012/0143504 A1 * | 6/2012 | Kalai et al. | 701/533 |
| 2012/0330906 A1 * | 12/2012 | Fredericks et al. | 707/692 |

OTHER PUBLICATIONS

International Search Report and Written Opinion of International Application No. PCT/US2013/046903, mailed Oct. 2, 2013, 14 pp.
Henry, "TripIt Unveils iPhone App: Access your Travel Info Anywhere", Apr. 14, 2009 [online]. Retrieved from the Internet: <http://appscout.pcmag.com/free-downloads/273040-tripit-unveils-iphone-app-access-your-travel-info-anywhere> 3 pgs.
Mawer, "Website of the Week: www.tripit.com", Apr. 27, 2012 [online]. Retrieved from the Internet: <http://web.archive.org/web/20120427194635/http://dailymail.co.uk/travel/article-2135576/Website-Of-The-Week-www-tripit-com.html> 6 pgs.

* cited by examiner

*Primary Examiner* — Magdi Elhag
(74) *Attorney, Agent, or Firm* — Shumaker & Sieffert, P.A.

(57) ABSTRACT

A computing system extracts, based on one or more electronic messages sent or received by a user of a mobile computing device, travel plan information associated with the user of the mobile computing device. The travel plan information may indicate a destination to which the user is planning to travel. In response to extracting the travel plan information, the computing system may send an instruction to the mobile computing device to cache, in advance of the user arriving at the destination, information associated with the destination. In this way, the mobile computing device may access the information associated with the destination while at the destination, even if the mobile computing device is unable to access the information via a wireless communication channel.

28 Claims, 9 Drawing Sheets

PRE-CACHING DATA RELATED TO A TRAVEL DESTINATION

This application claims the benefit of U.S. Provisional Patent Application No. 61/664,135, filed Jun. 25, 2012, the entire content of which is hereby incorporated by reference.

BACKGROUND

When a user travels to a geographic region, the user may want to use a mobile computing device, such as a smartphone or tablet, to access data about the geographic region. For instance, the user may want to use a mobile computing device to access a map of the geographic region. However, the mobile computing device may not be able to wirelessly retrieve such data when the mobile computing device is within the geographic region. For instance, a wireless data access plan associated with the mobile computing device may not allow the mobile computing device to send or receive data when the mobile computing device is in that particular geographic region.

SUMMARY

A computing system may extract, based on one or more electronic messages sent or received by a user of a mobile computing device, travel plan information associated with the user. The travel plan information may indicate a destination to which the user may be traveling. In response to extracting the travel plan information, the computing system may send to the mobile computing device an instruction to cache, in advance of the user arriving at the destination, information associated with the destination. In response, the mobile computing device may download and cache the data associated with the destination. Because the mobile computing device has cached the data associated with the destination prior to the user arriving at the destination, the mobile computing device may be able to access the data while the mobile computing device is at the destination.

This disclosure describes a method comprising receiving, by a mobile computing device, in advance of a user of the mobile computing device arriving at a destination, and in response to an extraction of travel plan information associated with the user based on an electronic message sent or received by the user, information associated with the destination. The method also comprises storing, by the mobile computing device, the information associated with the destination in a memory of the mobile computing device.

This disclosure also describes a method comprising extracting, by a computing system and based on an electronic message sent or received by a user of a mobile computing device, travel plan information associated with the user, wherein the electronic message comprises content formatted to be readable by a human, and wherein the travel plan information indicates a destination. The method also comprises sending, by the computing system to the mobile computing device, and in response to the extracting, an instruction for the mobile computing device to cache, in advance of the user arriving at the destination, information associated with the destination.

This disclosure also describes a method comprising receiving, by a computing device, a first message from a server system, the first message indicating to a user of a mobile computing device that the server system has extracted travel plan information associated with the user based on an electronic message sent or received by the user, the electronic message comprising content formatted to be readable by a human and the travel plan information indicating a destination. In addition, the method comprises providing, by the computing device, a second message to the server system, the second message instructing the server system to configure the mobile computing device to cache, in advance of the user arriving at the destination, information associated with the destination at the mobile computing device.

This disclosure also describes a computing system that comprises a memory that stores instructions and one or more processors that execute the instructions. Execution of the instructions configuring the computing system to receive an electronic message that was sent or received by a user of a mobile computing device, the electronic message comprising content formatted to be readable by a human. The instructions also cause the computing device to extract, from the electronic message, travel plan information associated with the user, the travel plan information indicating a destination and a date of departure to the destination. Furthermore, the instructions cause the computing device to send, in response to the extracting, to the mobile computing device an instruction for the mobile computing device to store at a local memory of the mobile computing device, in advance of the mobile computing device arriving at the destination, information associated with the destination.

This disclosure also describes a computer-readable storage medium that stores computer-executable instructions that, when executed, configure one or more processors of a computing system to provide a web-based email service that enables a user of a mobile computing device to send and receive email messages. The instructions also configure the computing system to extract, from one or more of the email messages, travel plan information associated with the user, the travel plan information indicating a destination and a date of departure to the destination. The instructions also configure the computing system to send a request for the user to indicate whether to configure the mobile computing device to pre-cache data associated with one or more maps of the destination. In addition, the instructions configure the computing system to send, in response to receiving instructions to pre-cache the data associated with the one or more maps of the destination, to the mobile computing device an instruction for the mobile computing device to cache, in advance of the user arriving at the destination, the data associated with the one or more maps of the destination.

One or more examples are set forth in the accompanying drawings and the description below. Other features, objects, and advantages will be apparent from the description and drawings, and from the claims.

DETAILED DESCRIPTION

According to one or more aspects, a computing system may be configured to extract travel plan information from one or more electronic messages sent to and/or received by a user of a mobile computing device. The travel plan information may indicate that the user is planning to travel to a particular destination, such as a city, region, or country. In response to extracting the travel plan information, the computing system may send to the mobile computing device instructions to cache, in advance of the user arriving at the destination, information associated with the destination. For instance, the computing system may send to the mobile computing device instructions to cache map data, turn-by-turn direction data, and/or other information that the user may find helpful while the user is at the destination.

Figure 1:
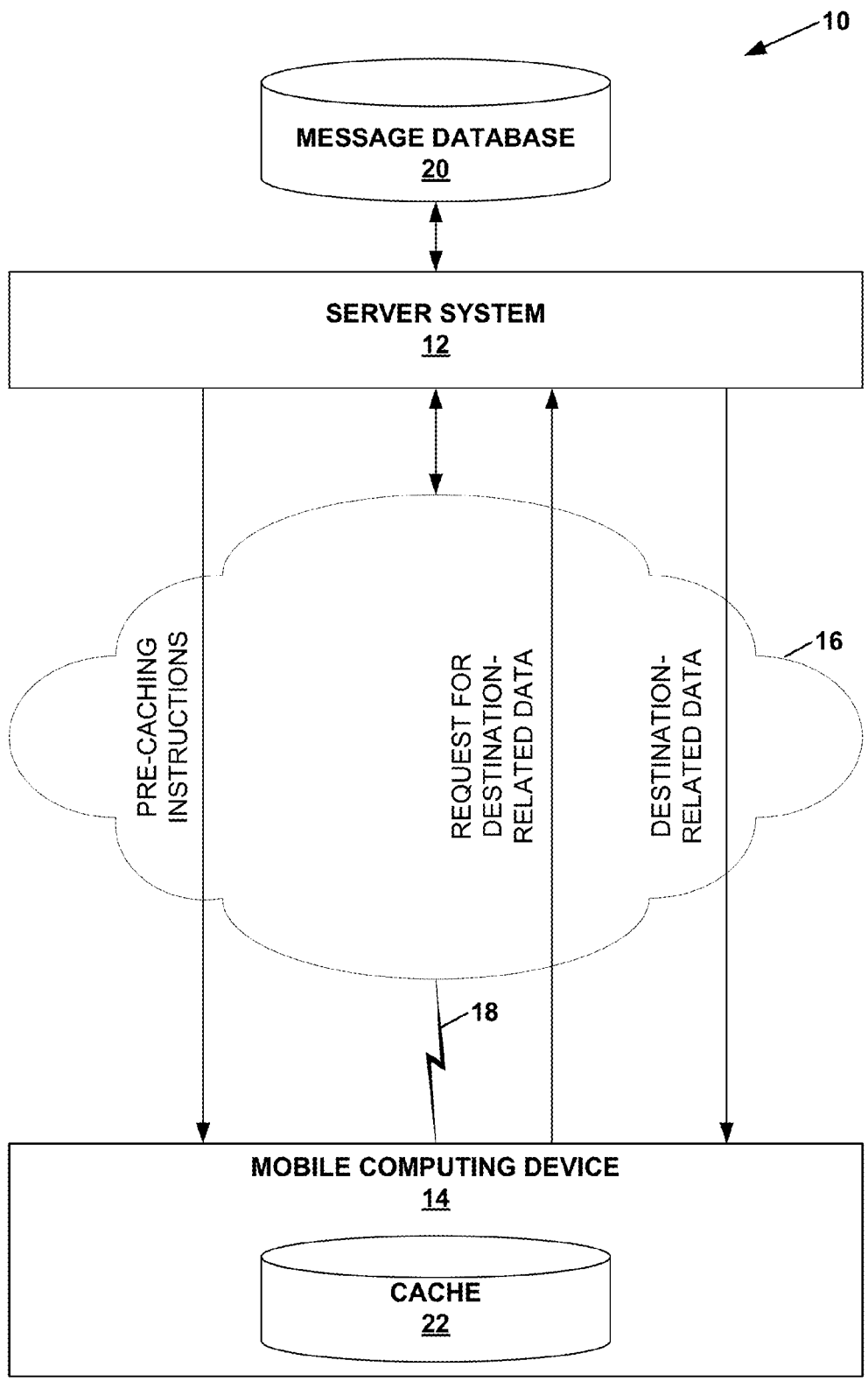
FIG. 1 is a block diagram that illustrates an example system that may be used to pre-cache data associated with a travel destination.

FIG. 1 is a block diagram that illustrates an example system 10 that may be used to pre-cache data associated with a travel destination. System 10 is merely one example. Other examples may include more, fewer, or different devices, systems, or components.

In the example of FIG. 1, system 10 includes a server system 12, a mobile computing device 14, and a communication network 16. Server system 12 may include one or more computing devices, such as server computers, personal computers, mainframe computers, and so on. Mobile computing device 14 may include a computing device that is designed for mobility. For example, mobile computing device 14 may be a smartphone, a tablet computer, a laptop computer, a personal media player, a portable gaming device, or another type of computing device.

Network 16 may facilitate communication between server system 12 and mobile computing device 14. Network 16 may include various types of communication networks. For example, network 16 may include a local area network, the Internet, and/or other types of communication networks. Mobile computing device 14 may communicate with other computing devices connected to network 16 via one or more wireless communication channels 18. Example types of wireless communication channels include cellular telephone systems, WiFi networks, and so on.

Server system 12 may receive electronic messages sent by or sent to a user of mobile computing device 14. The electronic messages may include content formatted to be readable by a human. For example, server system 12 may provide a service that enables the user to send and receive electronic messages, such as email messages. For instance, in this example, server system 12 may provide a web-based email service in which server system 12 provides webpages that enable the user to compose and send email messages and webpages that enable the user to review received email messages. Alternatively, in this example, server system 12 may provide an email system in which server system 12 interacts with a specialized client application on mobile computing device 14 to enable the user to send and receive email messages. In other examples, server system 12 may receive short message service (SMS) text messages, social networking service posts, instant messages, or other types of electronic messages formatted to be readable by a human. Server system 12 may store the electronic messages in a message database 20.

After receiving permission from the user to do so, server system 12 may automatically analyze the electronic messages to extract travel plan information associated with the user. The travel plan information may indicate that the user is planning to travel to a particular destination at a particular time. The destination may be a geographic location, such as a city, state, or country. The travel plan information may also include other information, such as an anticipated time and date of departure to the destination and an anticipated time and date of departure from the destination.

Server system 12 may analyze the electronic messages in various ways. For example, server system 12 may parse the electronic messages for words and phrases associated with travel. In this example, server system 12 may use such words and phrases, along with other data, as input to an algorithm. The algorithm may determine a probability that, given the provided data, the user is planning to depart for the destination at a particular time and date. If this probability exceeds a given threshold, server system 12 may have successfully extracted travel plan information associated with the user. In this way, server system 12 or another computing device may parse the electronic message for words and phrases associated with travel, determine a probability that, given the words and phrases parsed from the electronic message, the user is planning to depart for the destination at a particular time and date, and may extract the travel plan information if the probability exceeds a given threshold.

In some instances, the algorithm includes a machine learning algorithm, such as a Bayesian network algorithm, a neural network algorithm, or another type of machine learning algorithm.

After obtaining permission from the user, server system 12 may, in addition to analyzing electronic messages, analyze other data associated with the user to extract the travel plan information associated with the user. For example, server system 12 may analyze patterns of web searches initiated by the user, patterns of web site visitations, calendar information, task lists, and so on. For instance, server system 12 may determine that the user is likely going to be traveling to a foreign city if the user's calendar includes one or more appointments with locations in the foreign city.

In another example, server system 12 may store a plurality of email templates. Each of the email templates may describe a known format of email messages from travel-related businesses, such as hotels, airlines, travel agencies, rental car companies, and so on. Travel-related business may send email messages to confirm travel reservations. In this example, server system 12 may identify one of the email templates as being relevant to an email message associated with the user. The email message may conform to the format described by the relevant email template. After identifying the relevant email template, server system 12 may parse the travel plan information from the email message using the relevant email template.

If server system 12 successfully extracts travel plan information from one or more of the electronic messages, server system 12 may send a request to a computing device associated with the user. The request may invite the user to indicate whether the user would like mobile computing device 14 to pre-cache data associated with the destination (i.e., destination-related data) in advance of the user arriving at the destination. Server system 12 may send the request to various computing devices associated with the user. For example, server system 12 may send the request to mobile computing device 14. In another example, server system 12 may send the request to a personal computer associated with the user.

Server system 12 may send the request in various ways. For example, server system 12 may send an electronic message (e.g., an email message, a text message, an instant message, etc.) to mobile computing device 14 or another computing device associated with the user. The electronic message may include text that prompts the user to indicate whether the user would like mobile computing device 14 to pre-cache the destination-related data. The electronic message may also include one or more links or other controls that enable the user to respond. In this example, server system 12 may send the electronic message to mobile computing device 14 at various times. For instance, in some examples, server system 12 may send the electronic message to mobile computing device 14 at a time that server system 12 extracts the travel plan information. In other examples, server system 12 may wait to send the electronic message to mobile computing device 14 until one or more events occur. For instance, server system 12 may wait to send the electronic message to mobile computing device 14 until there is less than a threshold amount of time (e.g., two days) before the user's anticipated departure for the destination.

In another example, server system 12 may send the request to mobile computing device 14, and mobile computing device 14 may wait to prompt the user to indicate whether the mobile computing device 14 should pre-cache the destination-related data. For instance, in this example, server system 12 may send the request to mobile computing device 14 several weeks before the user's anticipated departure for the destination, but mobile computing device 14 may wait to prompt the user to indicate whether mobile computing device 14 should pre-cache the destination-related data until there is less than a threshold amount of time before the user's anticipated departure for the destination. For instance, mobile computing device 14 may wait to prompt the user to indicate whether mobile computing device 14 should pre-cache the destination-related data until there is less than one day after the user's anticipated departure for the destination.

In another example, server system 12 may provide a web-based email service. In this example, server system 12 may generate a webpage that includes a previously-received email message. The webpage may include a message that indicates that server system 12 has determined, based on the received email message, that the user might be traveling and that server system 12 can configure mobile computing device 14 to pre-cache destination-related data. The webpage may include links or other features that enable to user to indicate whether the user wants mobile computing device 14 to pre-cache the destination-related data. In this example, server system 12 may generate a similar message in a webpage when the user sends an email message.

If the user indicates that the user wants mobile computing device 14 to pre-cache the destination-related data, server system 12 may send pre-caching instructions to mobile computing device 14 in advance of the user arriving at the destination. Server system 12 may send the pre-caching instructions to mobile computing device 14 in various ways. For example, server system 12 may provide an email service. In this example, server system 12 may send a special-purpose email to mobile computing device 14. The special-purpose email is not designed to be read by the user, but rather is interpretable by mobile computing device 14 to instruct mobile computing device 14 to pre-cache the destination-related data. In another example, mobile computing device 14 may periodically poll server system 12 for data. In this example, server system 12 may send the pre-caching instructions in response to receiving a polling message from mobile computing device 14. In another example, mobile computing device 14 may be configured to receive messages from server system 12 that instruct mobile computing device 14 to download messages from server system 12. In this example, server system 12 may send the instructions to mobile computing device 14 in response to a request from mobile computing device 14 to download messages.

In some examples, server system 12 may send the pre-caching instructions to mobile computing device 14 upon determining that the user would like to pre-cache the destination-related data. In another example, server system 12 may wait until closer to the anticipated date of the user's departure to send the pre-caching instructions. For instance, if the user's anticipated departure is more than one week into the future, server system 12 may wait until one week before the user's anticipated departure to send the pre-caching instructions. In some instances, server system 12 may store travel plan information in a database. Server system 12 or another computing system may periodically poll the database for travel plan information with departure dates occurring within a given time period. Server system 12 or the other computing system may send the pre-caching instructions upon determining that the database stores a set of travel plan information with a departure data occurring within the given time period.

In response to receiving the pre-caching instructions, mobile computing device 14 may send one or more requests for destination-related data. Mobile computing device 14 may receive the destination-related data in response to the requests for destination-related data. In the example of FIG. 1, mobile computing device 14 sends requests for destination-related data to server system 12 and receives destination-related data from server system 12. In other examples, mobile computing device 14 may send requests for destination-related data to and receive destination-related data from other server systems. In other words, mobile computing device 14 may download the information associated with the destination from one or more remote computing systems other than server system 12. For example, the destination-related data may include a map of the destination and reviews of restaurants at the destination. In this example, mobile computing device 14 may send a request to a first server that provides mapping data and may send a request to a second server that provides the reviews of the restaurants at the destination.

In some examples, mobile computing device 14 does not immediately send requests for destination-related data in response to receiving the pre-caching instructions. Rather, in such examples, mobile computing device 14 may wait for conditions to be appropriate before sending the requests for the destination-related data. The conditions may be appropriate when mobile computing device 14, as one example, is able to communicate with computing devices connected to network 16 via an unmetered wireless channel, as opposed to a metered cellular telephone network. In other words, mobile computing device 14 may download the destination-related data in response to determining that mobile computing device 14 is able to download the destination-related data via an unmetered wireless channel. In some examples, mobile computing device 14 may download the destination-related data over a metered wireless channel if the user's anticipated departure is relatively soon (e.g., 24 hours). The user may be billed based on the amount of data that the user sends and/or receives over a metered wireless channel. In contrast, the amount the user is billed for using an unmetered wireless channel may be unrelated to the amount of data the user sends and/or receives over the unmetered wireless channel.

Furthermore, mobile computing device 14 may receive the pre-caching instructions a considerable time in advance of the user arriving at the destination. To ensure that mobile computing device 14 caches relatively up-to-date destination-related data, mobile computing device 14 may wait to download the destination-related data until a few days or hours before user's anticipated departure for the destination.

The destination-related data may include various types of data associated with the destination. For example, the destination-related data may include data associated with one or more maps of the destination, data associated with turn-by-turn travel directions to and from various locations (e.g., airports, hotels, etc.) at the destination, rental car information, hotel reservation information, data associated with traveler amenities at the destination, and so on. The information about traveler amenities may include information about hotels, information about restaurants, information about tourist attractions, information about hospitals, helpful phrases in the local language, information about embassy/consulate information, information about emergency services, and other information that the user may find useful when traveling to the destination.

In some examples, mobile computing device 14 and/or server system 12 may receive input from the user to configure which types of destination-related data to pre-cache. For example, mobile computing device 14 and/or server system 12 may receive input from the user indicating that mobile computing device 14 should pre-cache data associated with one or more maps of the destination, but not data associated with tourist attractions.

In some examples, mobile computing device 14 may download and pre-cache additional data in response to receiving the pre-caching instructions. This additional data may not necessarily be associated with the destination. For example, mobile computing device 14 may automatically download and pre-cache data, such as music files, multimedia files, word processor documents, presentation documents, portable document format (PDF) documents, email messages, text messages, etc., in response to receiving the pre-caching instructions. Such data may include data that the user has been using recently, data flagged by the user as being important or related to the travel, or otherwise.

In another example, mobile computing device 14 may download particular applications in response to receiving the pre-caching instructions. For instance, mobile computing device 14 may download an application that assists with language translation in response to receiving the pre-caching instructions. In some examples, server system 10 or another computing system may send a list of suggested applications to mobile computing device 14. In response, mobile computing device 14 may present the list of suggested applications to the user. The user may then select any of the suggested applications from the list to download and install on mobile computing device 14. The suggested applications may include applications that the user may find useful once the user reaches the destination. For instance, the suggested applications may include applications for language translation, transportation schedules, and so on.

In another example, mobile computing device 14 may download data from a home or office energy management system or security system. The data from the energy management system may indicate a current energy configuration of a home or office. The current energy configuration of the home or office may indicate the current status of particular lights, fans, electrical systems, appliances, heating and cooling systems, water heaters, irrigation systems, and so on. The data from the security system may indicate a current security configuration of a home or office. The current security configuration of the home or office may indicate whether an alarm system is currently armed, whether doors and windows are shut and locked, and so on. In this example, mobile computing device 14 may download such data after mobile computing device 14 has received the pre-caching instructions and in response to determining that mobile computing device 14 is physically moving away from the home or office on the user's anticipated date of departure (based on detected movement of mobile computing device 14). The user may be able to access this data to determine whether the user left the home or office in an appropriate energy and/or security configuration. Having access to this information may reduce the user's potential anxiety about whether the home or office has the appropriate energy and/or security configuration.

Furthermore, in some examples, mobile computing device 14 may determine, in response to receiving the pre-caching instructions, whether the user has departed for the destination. For example, mobile computing device 14 may determine, on the day of the user's anticipated departure for the destination, that the user is at or is moving toward an airport, bus terminal, or train station, or is exiting a particular city. In this example, mobile computing device 14 may make such a determination based on geo-positioning data. In response to making such a determination, mobile computing device 14 may provide one or more notifications to the user. For example, mobile computing device 14 may provide one or more notifications to the user if one or more aspects of a current energy and/or security configuration of the user's home or office are not in the appropriate configuration. In another example, mobile computing device 14 may notify the user to set an automatic reply message (e.g., an out-of-office message) if the user has not already done so.

After mobile computing device 14 receives the destination-related data, mobile computing device 14 may store the destination-related data in a local cache 22. Local cache 22 may be a local memory of mobile computing device 14. Mobile computing device 14 may store the destination-related data in cache 22 for various lengths of time. For example, the pre-caching instructions may indicate an anticipated time when the user plans to depart from the destination. In this example, mobile computing device 14 may store the destination-related data in cache 22 at least until the anticipated time when the user plans to depart from the destination. Thus, in this example, mobile computing device 14 may determine, based on the instructions, that the user has departed from the destination. In another example, mobile computing device 14 may store the destination-related data in cache 22 at least until geo-positioning information (e.g., Global Positioning System (GPS) coordinates) of mobile computing device 14 indicate that mobile computing device 14 is no longer at the destination. Hence, in these examples, mobile computing device 14 may determine that the user has departed from the destination and may purge, in response to determining that the user has departed from the destination, the information associated with the destination from the local cache. In other examples, mobile computing device 14 may store the destination-related data in cache 22 for fixed periods of time, such as thirty days.

Mobile computing device 14 may store the destination-related data in cache 22 in various ways. For example, mobile computing device 14 may be configured to provide a plurality of software applications (e.g., "apps"). In this example, mobile computing device 14 may provide portions of the destination-related data to appropriate software applications. The software applications may then cache the portions of the destination-related data in suitable formats. For example, the destination-related data may include map data and restaurant review data. In this example, mobile computing device 14 may provide the map data to a maps application and may provide the restaurant review data to an application that presents reviews of businesses.

After the user reaches the destination, mobile computing device 14 may retrieve some or all of the destination-related data from cache 22. Mobile computing device 14 may then present content based on the destination-related data to the user. Mobile computing device 14 may present content based on the destination-related data in various ways. For example, mobile computing device 14 may present content based on the destination-related data in user interfaces of one or more applications that execute on mobile computing device 14. In another example, mobile computing device 14 may present content based on the destination-related data in one or more information widgets within a home user interface of mobile computing device 14.

Mobile computing device 14 may retrieve the destination-related data in response to various events. For example, mobile computing device 14 may receive user input to launch a maps application. In this example, if the user uses the maps application to search for a map of the destination, mobile computing device 14 may retrieve the map from local cache 22 instead of trying to retrieve the map from a wireless communication network. In another example, mobile computing device 14 may execute an application that presents content based on all of the destination-related data.

In some examples, the destination-related data may include a plurality of resources, such as webpages, documents, files, query results, and so on. In such examples, mobile computing device 14 may store resource identifiers, such as uniform resource locators (URLs), associated with respective resources in the destination-related data. When an application executing on mobile computing device 14 requests a resource from the Internet, the application may generate a request, such as a Hypertext Transfer Protocol (HTTP) request, that indicates a resource identifier associated with the resource. In some such examples, mobile computing device 14 does not transmit the request, but rather compares the resource identifier indicated by the request with the resource identifiers associated with the resources in the destination-related data in local cache 22. If mobile computing device 14 identifies a resource in the destination-related data in local cache 22, mobile computing device 14 may provide the resource to the application. In this way, it may be unnecessary for the application to be specifically configured to use local cache 22.

In some examples, mobile computing device 14 may output a graphical user interface (GUI) for display at a display screen. The GUI may include graphical elements, such as icons or information widgets, associated with respective applications installed at mobile computing device 14. Some of the installed applications may be network-dependent applications that only function properly when mobile computing device 14 has network access and that do not use data stored in local cache 22. While mobile computing device 14 is at the destination, mobile computing device 14 may visually differentiate the graphical elements associated with network-dependent applications from the graphical elements associated with applications that are able to use the pre-cached destination-related data or applications that are able to function properly when mobile computing device 14 does not have network access. For example, mobile computing device 14 may gray-out or increase the transparency of the graphical elements associated with network-dependent applications within the GUI while mobile computing device 14 is at the destination and does not have network access. In this example, mobile computing device 14 may maintain the original appearances of the graphical elements associated with applications that are able to use the pre-cached destination-related data or applications that are able to function properly when mobile computing device 14 does not have network access. In some examples, mobile computing device 14 may hide the graphical elements associated with the network-dependent applications from the GUI if mobile computing device 14 is at the destination and does not have network access.

In this way, a computing system (e.g., server system 12) may extract, based on an electronic message sent or received by a user of a mobile computing device (e.g., mobile computing device 14), travel plan information associated with the user. The electronic message may include content formatted to be readable by a human and the travel plan information may indicate a destination. The computing device may send to the mobile computing device, in response to the extracting, an instruction for the mobile computing device to cache, in advance of the user arriving at the destination, information associated with the destination.

Moreover, a computing device (e.g., mobile computing device 14 or another device) may receive a first message from a server system (e.g., server system 12). The first message may indicate to a user of a mobile computing device that the server system has extracted travel plan information associated with the user based on an electronic message sent or received by the user. The electronic message may include content formatted to be readable by a human and the travel plan information may indicate a destination. The computing device may provide a second message to the server system. The second message may instruct the server system to configure the mobile computing device to cache, in advance of the user arriving at the destination, information associated with the destination at the mobile computing device.

Figure 2:
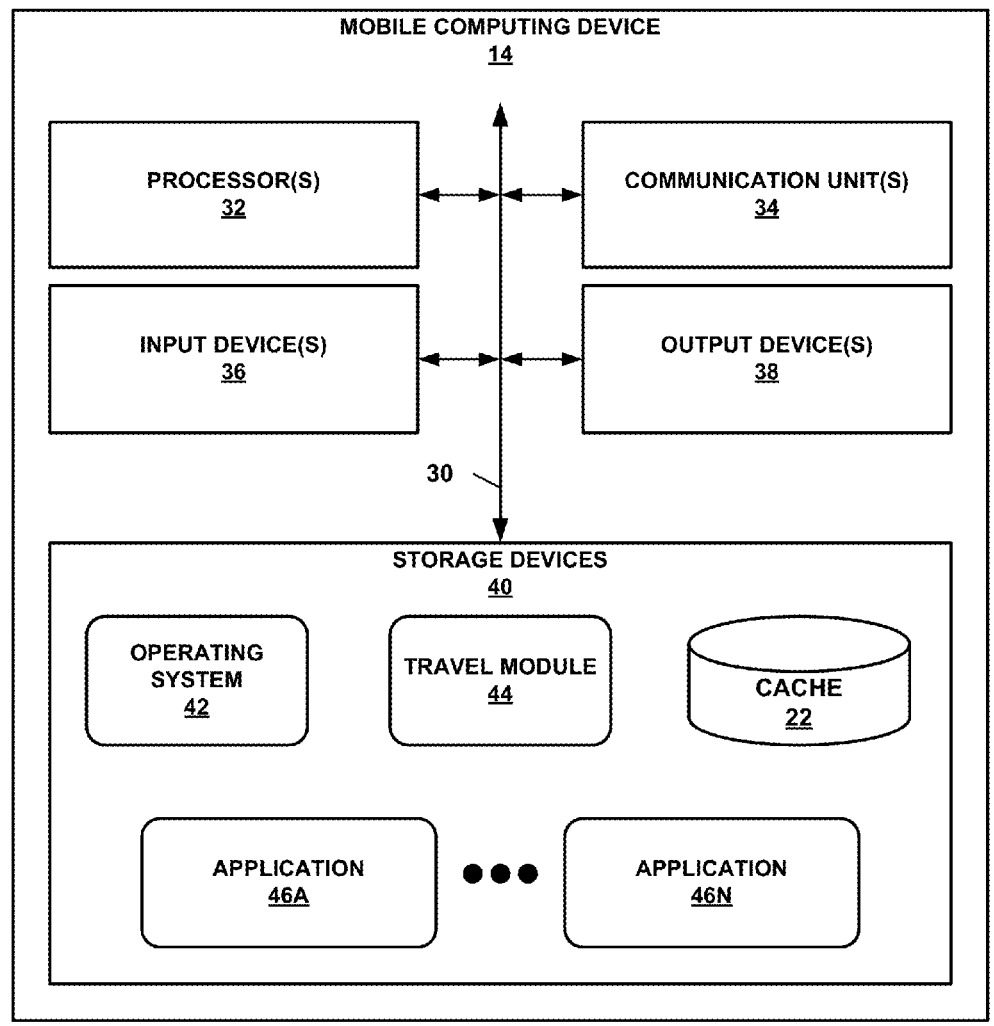
FIG. 2 is a block diagram that illustrates an example configuration of a mobile computing device.

FIG. 2 is a block diagram that illustrates an example configuration of mobile computing device 14. FIG. 2 illustrates only one particular example of mobile computing device 14, and many other examples of mobile computing device 14 may be used in other instances.

In the example of FIG. 2, mobile computing device 14 includes communication channels 30, one or more processors 32, one or more communication units 34, one or more input devices 36, one or more output devices 38, and one or more storage devices 40. In other examples, mobile computing device 14 may include more, fewer, or different components. For example, mobile computing device 14 may include a battery to provide power to the components of mobile computing device 14. In another example, mobile computing device 14 may not necessary include communication units 34.

Communication channels 30 facilitate communication between processors 32, communications units 34, input devices 36, output devices 38, and storage devices 40. In some examples, communication channels 30 may include a system bus, a network connection, an interprocess communication data structure, or another type of channel for communicating data.

Processors 32 may include one or more microprocessors, controllers, digital signal processors (DSPs), application specific integrated circuits (ASICs), field-programmable gate arrays (FPGAs), or equivalent discrete or integrated logic circuitry. Processors 32 may be configured to implement functionality and/or process instructions for execution within mobile computing device 14. For example, one or more processors 32 may be capable of executing instructions stored in storage devices 40.

Communication units 34 may enable mobile computing device 14 to communicate with one or more external devices via one or more networks, such as one or more wireless networks. Communication units 34 may include network interface cards, such as Ethernet cards, optical transceivers, radio frequency transceivers, or other types of devices that are able send and receive information. Other examples of such network interfaces may include Bluetooth, 3G and WiFi radios as well as USB.

Input devices 36 may enable mobile computing device 14 to receive input from a user (i.e., user input). Input devices 36 may be implemented as various types of devices. For example, one or more of input devices 36 may be implemented as a touchscreen, a mouse, a keyboard, a voice responsive system, a video camera, a microphone or another type of device that enables mobile computing device 14 to receive user input.

Output devices 38 may enable mobile computing device 14 to provide output to a user using tactile, audio, or video stimuli. In some examples, output devices 38 may include sound cards, video graphics adapter cards, or other types of devices for converting a signal into an appropriate form understandable to humans or machines. In other examples, one or more of output devices 38 may be implemented as a speaker, a cathode ray tube (CRT) monitor, a liquid crystal display (LCD), or any other type of device that can generate output to a user.

Storage devices 40 may be configured to store information. In some examples, storage devices 40 may include temporary memory, meaning that a primary purpose of storage devices 40 is not long-term storage. In some examples, storage devices 40 may include volatile memory that does not maintain stored data when mobile computing device 14 is powered down. Example types of volatile memory include random access memories (RAM), dynamic random access memories (DRAM), static random access memories (SRAM), and other forms memory that do not maintain stored data when mobile computing device 14 is powered down. In some examples, storage devices 40 store program instructions for execution by processors 32. Software applications may use storage devices 40 to temporarily store information.

In some examples, storage devices 40 may include one or more computer-readable storage media. Storage devices 40 may further be configured for long-term storage of information. In some examples, storage devices 40 may include non-volatile memory. Example types of non-volatile memory may include magnetic hard disks, optical discs, floppy disks, flash memories, or forms of electrically programmable memories (EPROM) or electrically erasable and programmable (EEPROM) memories.

In the example of FIG. 2, storage devices 40 store local cache 22, an operating system 42, a travel module 44, and applications 46A-46N (collectively, "applications 46"). In other examples, storage devices 40 may store more, fewer, or different components.

Operating system 42 may control the operation of components of mobile computing device 14. For example, operating system 42 may enable travel module 44 and applications 46 to interact with processors 32, communication units 34, input devices 36, and output devices 38.

Each of applications 46 may cause mobile computing device 14 to perform one or more functions. For example, one or more of applications 46 may cause mobile computing device 14 to present maps, reviews of businesses, provide turn-by-turn directions and so on. In some instances, one or more of applications 46 may cause mobile computing device 14 to communication with computing devices (such as server system 12) that are external to mobile computing device 14. For instance, one or more of applications 46 may be web browsers.

Execution of instructions associated with travel module 44 may configure mobile computing device 14 to perform various actions associated with pre-caching travel-related data. For instance, execution of instructions associated with travel module 44 may configure mobile computing device 14 to receive a first message from a server system, the first message indicating to a user of mobile computing device 14 that the server system has extracted travel plan information associated with the user based on at least one electronic message sent or received by the user. Furthermore, execution of the instructions associated with travel module 44 may configure mobile computing device 14 to provide a second message to the server system, the second message instructing the server system to configure mobile computing device 14 to cache, in advance of the user arriving at the destination, information associated with the destination.

Server system 14 may be implemented using one or more computing devices. Such computing devices may be implemented in a manner similar to that shown in FIG. 2. However, storage devices of such computing devices may store different data than storage devices 44 of mobile computing device 14. Instead, the storage devices of the computing devices of server system 14 may store instructions that configure the computing devices to provide the functionality of server system 14.

Figure 3:
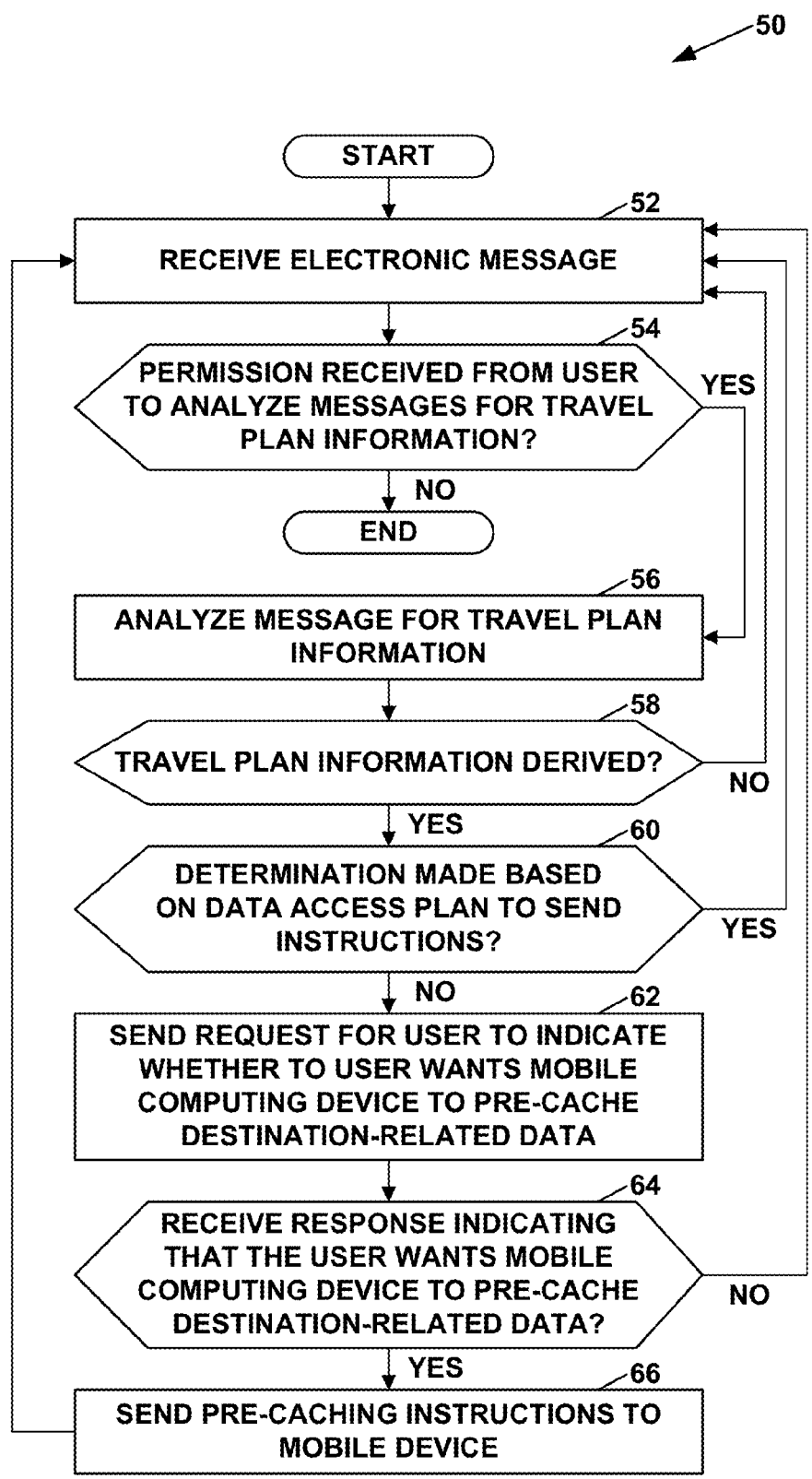
FIG. 3 is a flowchart that illustrates an example operation of a server system.

FIG. 3 is a flowchart that illustrates an example operation 50 of server system 12. Although FIG. 3 is described with reference to FIG. 1, operation 50 may be implemented by server systems in systems other than the example system of FIG. 1. FIG. 3 is merely one non-limiting example. Other examples may include more, fewer, or different steps.

After starting operation 50, server system 12 may receive an electronic message associated with the user of mobile computing device 14 (52). For instance, server system 12 may receive an electronic message that is sent or received by the user.

After receiving the electronic message, server system 12 may determine whether permission has been received from the user of mobile computing device 14 to analyze electronic messages sent to or from the user to extract travel plan information associated with the user (54). In response to determining the permission has not been received from the user ("NO" of 54), server system 12 may end operation 50 with respect to the user. Computing device 14 may determine whether permission has been received in various ways. For example, computing device 14 may determine whether the permissions have been received from the user at least in part by accessing a database that stores data identifying people who have agreed to have their electronic messages analyzed for purposes of pre-caching destination-related data. Users may indicate that they agree to have their electronic messages analyzed in this way by accepting one or more on-screen or printed user license agreements. Thus, server system 12 may only analyze the user's messages if the user opts in.

On the other hand, in response to determining that the permission has been received ("YES" of 54), server system 12 may analyze the electronic message to extract travel plan information associated with the user (56). As described above, server system 12 may also extract the travel plan information based on other data, such as appointments on an electronic calendar associated with the user (to name one non-limiting example).

After analyzing the electronic message, server system 12 may determine whether server system 12 was able to extract travel plan information associated with the user (58). In response to determining that server system 12 was unable to extract travel plan information associated with the user ("NO" 58), server system 12 may wait to receive another electronic message associated with the user (52).

However, in response to determining that server system 12 was able to extract travel plan information associated with the user ("YES" of 58), server system 12 may determine whether, based on a data access plan associated with mobile computing device 14, whether to send instructions to mobile computing device 14 to cache destination-related data in advance of the user arriving at the destination (60). For example, server system 12 may determine, based on the data access plan associated with mobile computing device 14, whether mobile computing device 14 is able to send or receive data via a wireless communication network at the destination. In this example, mobile computing device 14 may not receive instruction to cache destination-related data if mobile computing device 14 is associated with a data access plan that allows mobile computing device 14 to send and receive data via a wireless communication network at the destination. In another example, server system 12 may determine, based on the data access plan associated with mobile computing device 14, whether mobile computing device 14 is able to send or receive data via a wireless communication network at the destination without the user incurring additional fees. Server system 12 may, after obtaining consent from the user, retrieve information associated with the data access plan from a provider of the data access plan, such as a telephone company or Internet Service Provider. The data access plan may control, for example, the locations where mobile computing device 14 is allowed to access wireless communication networks and how the user is billed for such access.

In response to making a determination, based on the data access plan, not to send the instructions to mobile computing device 14 ("NO" of 60), server system 12 may wait to receive another electronic message associated with the user (52). However, in response to making the determination based on the data access plan to send the instructions to mobile computing device 14 ("YES" of 60), server system 12 may send a request to a computing device associated with the user (62). The request may invite the user to indicate whether the user wants mobile computing device 14 to pre-cache information associated with the destination (i.e., destination-related data).

Subsequently, server system 12 may determine whether server system 12 has received a response from the computing device indicating that the user wants mobile computing device 14 to pre-cache the destination-related data ("NO" of 64), server system 12 may wait to receive another electronic message associated with the user (52). On the other hand, in response to receiving an indication from the user to pre-cache the destination-related data ("YES" of 64), server system 12 may send pre-caching instructions to mobile computing device 14 (66). The pre-caching instructions may instruct mobile computing device 14 to cache, in advance of the user arriving at the destination, information associated with the destination. In some examples, the pre-caching instructions may include at least some of the information associated with the destination. Furthermore, in some examples, the pre-caching instructions may include executable instructions for caching the information associated with the destination. In such examples, the pre-caching instructions may include a data package, such as an Android Package (.apk) file.

Figure 4:
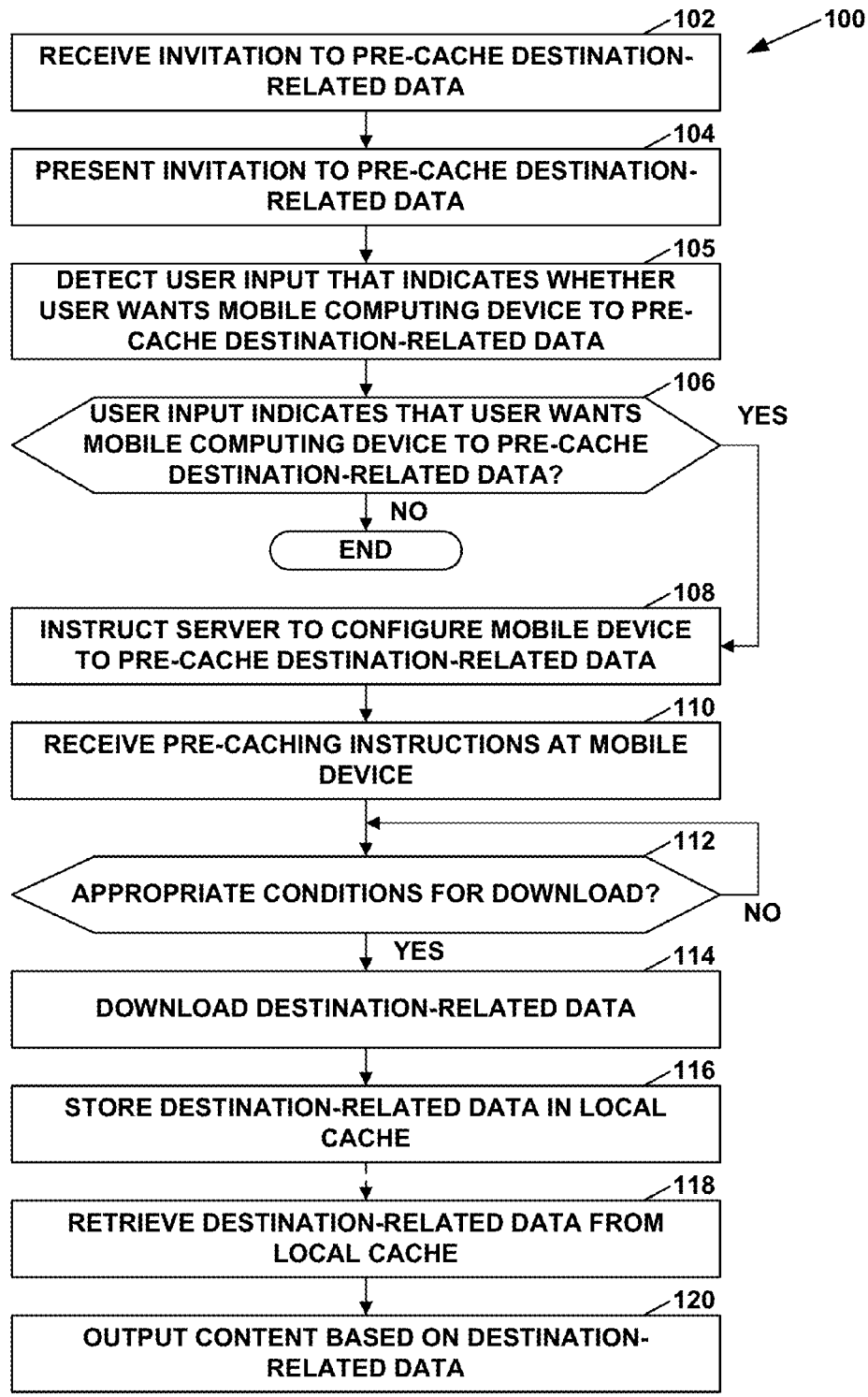
FIG. 4 is a flowchart that illustrates an example operation of the mobile computing device.

FIG. 4 is a flowchart that illustrates an example operation 100 performed by mobile computing device 14. Although FIG. 4 is described with reference to FIG. 1, operation 100 may be implemented by mobile computing devices in systems other than the example system of FIG. 1. FIG. 4 is merely one non-limiting example. Other examples may include more, fewer, or different steps. Moreover, in some examples, one or more of the steps of operation 100 may be performed by a computing device other than a mobile computing device.

After mobile computing device 14 starts operation 100, mobile computing device 14 may receive a message from server system 12 indicating that server system 12 has extracted travel plan information associated with the user and requesting the user to indicate whether the user wants to pre-cache destination-related data at mobile computing device 14 (102). In response, mobile computing device 14 may indicate to the user that server system 12 has requested the user to indicate whether the user wants to pre-cache destination-related data at mobile computing device 14 (104). Subsequently, mobile computing device 14 may detect user input that indicates whether the user wants mobile computing device 14 to pre-cache destination-related data (105). In response to receiving the user input, mobile computing device 14 may determine whether the user input indicates that the user wants mobile computing device 14 to pre-cache the destination-related data (106). In response to determining that the user input indicates that the user does not want mobile computing device 14 to pre-cache the destination-related data ("NO" of 106), mobile computing device 14 may end operation 100.

However, in response to determining that the user input indicates that the user wants mobile computing device 14 to pre-cache the destination-related data ("YES" of 106), mobile computing device 14 may instruct server system 12 to configure mobile computing device 14 to pre-cache the destination-related data (108). Subsequently, mobile computing device 14 may receive pre-caching instructions from server system 12 (110). In response to receiving the pre-caching instructions, mobile computing device 14 may determine whether the current conditions are appropriate for a download of destination-related data (112). If the current conditions are not appropriate for a download of the destination-related data ("NO" of 112), mobile computing device 14 may wait until the current conditions are appropriate for a download of the destination-related data. On the other hand, if the current conditions are appropriate for a download of the destination-related data ("YES" of 112), mobile computing device 14 may download the destination-related data from one or more servers (114). After downloading the destination-related data, mobile computing device 14 may store the destination-related data in local cache 22 (116).

Subsequently, while the user is at the destination, mobile computing device 14 may retrieve some or all of the destination-related data from local cache 22 (118). After retrieving the destination-related data from local cache 22, mobile computing device 14 may display content based on the retrieved destination-related data (120). In other words, mobile computing device 14 may output, while mobile computing device 14 is at the destination, content for display by a display device, the content based on the information associated with the destination.

In this way, mobile computing device 14 may receive, in advance of a user of mobile computing device 14 arriving at a destination, and in response to an extraction of travel plan information associated with the user based on an electronic message sent or received by the user, information associated with the destination. Mobile computing device 14 may store the information associated with the destination in a local cache at mobile computing device 14.

Figure 5:
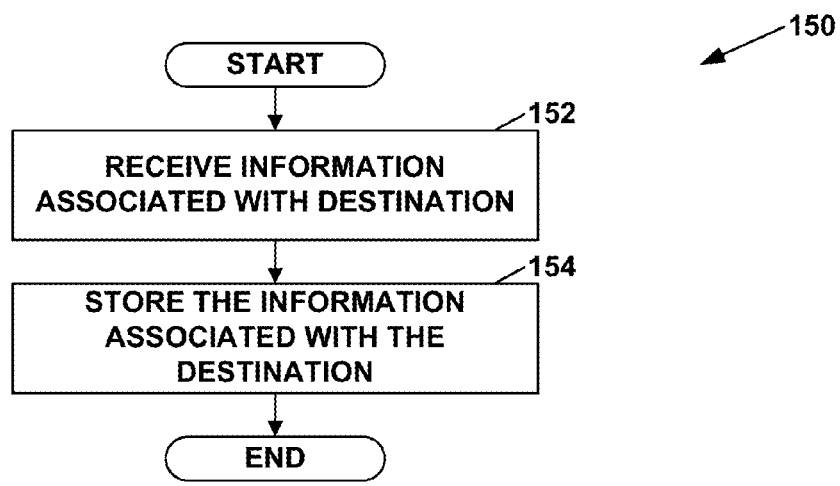
FIG. 5 is a flowchart that illustrates an example operation, in accordance with one or more techniques of this disclosure.

FIG. 5 is a flowchart that illustrates an example operation, in accordance with one or more techniques of this disclosure. After a mobile computing device starts operation 150, the mobile computing device may receive, in advance of a user of the mobile computing device arriving at a destination, and in response to an extraction of travel plan information associated with the user based on an electronic message sent or received by the user, information associated with the destination (152). In addition, the mobile computing device may store the information associated with the destination in a memory of the mobile computing device (154).

Figure 6:
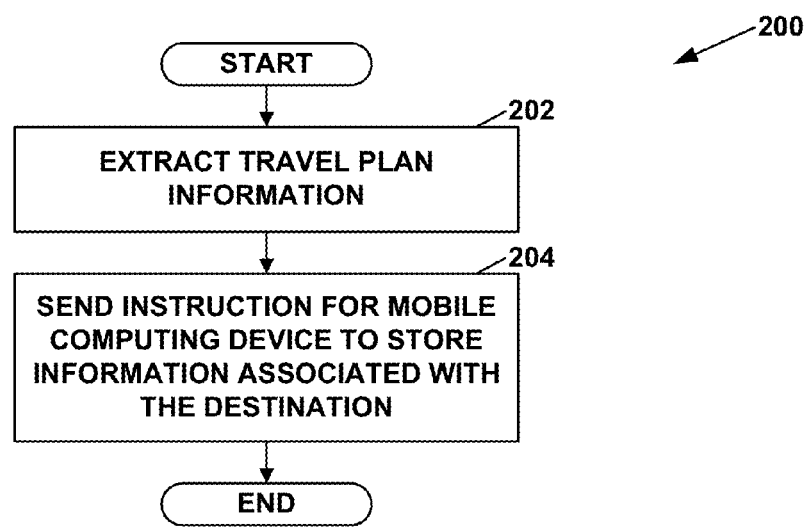
FIG. 6 is a flowchart that illustrates an example operation, in accordance with one or more techniques of this disclosure.

FIG. 6 is a flowchart that illustrates an example operation 200, in accordance with one or more techniques of this disclosure. After a computing system (such as server system 12) initiates operation 200, the computing system may extract, based on an electronic message sent or received by a user of a mobile computing device (e.g., mobile computing device 14), travel plan information associated with the user (202). The electronic message may comprise content formatted to be readable by a human. The travel plan information may indicate a destination. Furthermore, the computing system may send to the mobile computing device, and in response to the extracting, an instruction for the mobile computing device to store at a local memory of the mobile computing device, and in advance of the mobile computing device arriving at the destination, information associated with the destination (204).

Figure 7:
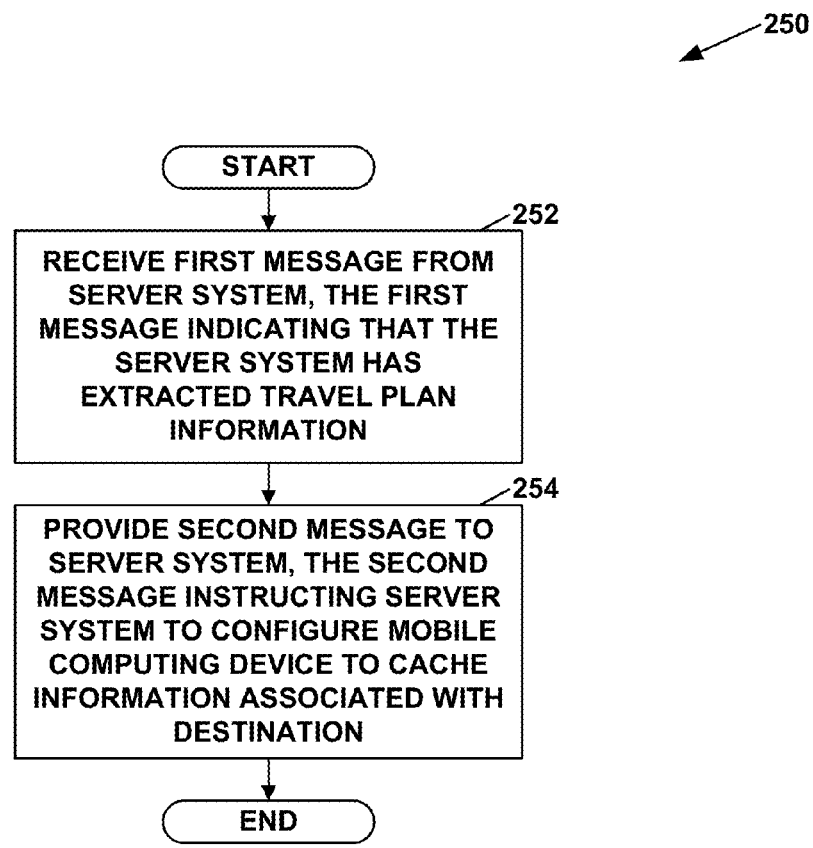
FIG. 7 is a flowchart that illustrates an example operation, in accordance with one or more techniques of this disclosure.

FIG. 7 is a flowchart that illustrates an example operation 250, in accordance with one or more techniques of this disclosure. After a computing device (such as mobile computing device 14) initiates operation 250, the computing device may receive a first message from a server system (252). The first message may indicate to a user of a mobile computing device that the server system has extracted travel plan information associated with the user based on an electronic message sent or received by the user. The electronic message may comprise content formatted to be readable by a human and the travel plan information indicating a destination. In addition, the computing device may provide a second message to the server system (254). The second message may instruct the server system to configure the mobile computing device to cache, in advance of the mobile computing device arriving at the destination, information associated with the destination at the mobile computing device.

Figure 8:
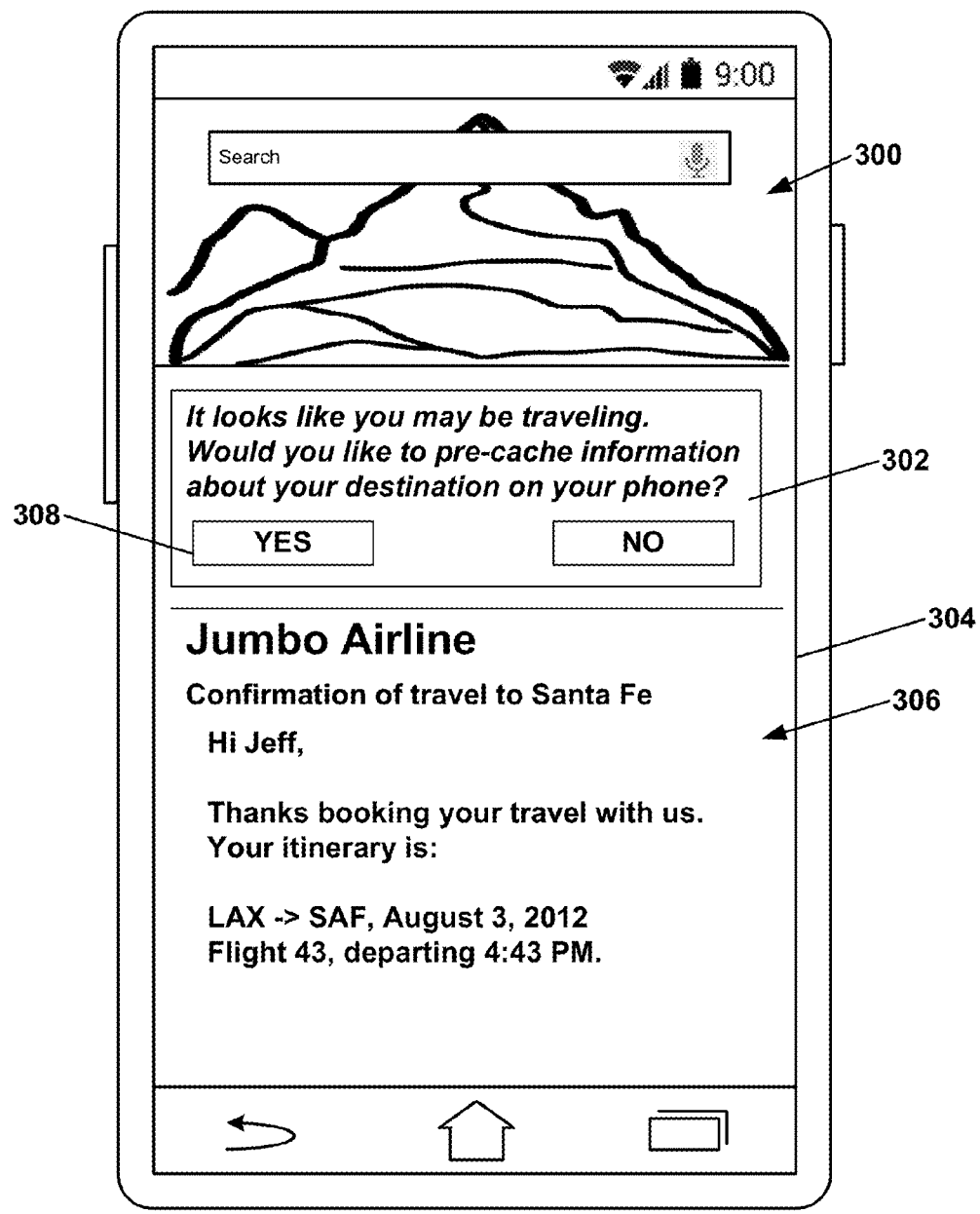
FIG. 8 is a conceptual diagram that illustrates an example user interface that includes a message that prompts a user to decide whether to cache information associated with a destination.

FIG. 8 is a conceptual diagram that illustrates an example user interface 300 that includes a message 302 that prompts a user to decide whether to cache information associated with a destination. In the example of FIG. 8, mobile computing device 14 outputs user interface 300 for display at a display device 304. User interface 300 may be a user interface for an email application. In the example of FIG. 8, user interface 300 includes an email message 306. Email message 306 describes an anticipated travel itinerary of a user.

Server system 12 may extract, based on email message 306, travel plan information associated with the user. Accordingly, in the example of FIG. 8, user interface 300 includes message 302 to prompt the user to indicate whether the user would like mobile computing device 14 to pre-cache information associated with the user's destination (e.g., Santa Fe). The user may indicate that the user wants mobile computing device 14 to pre-cache the information associated with the user's destination by selecting a "YES" button 308.

Figure 9:
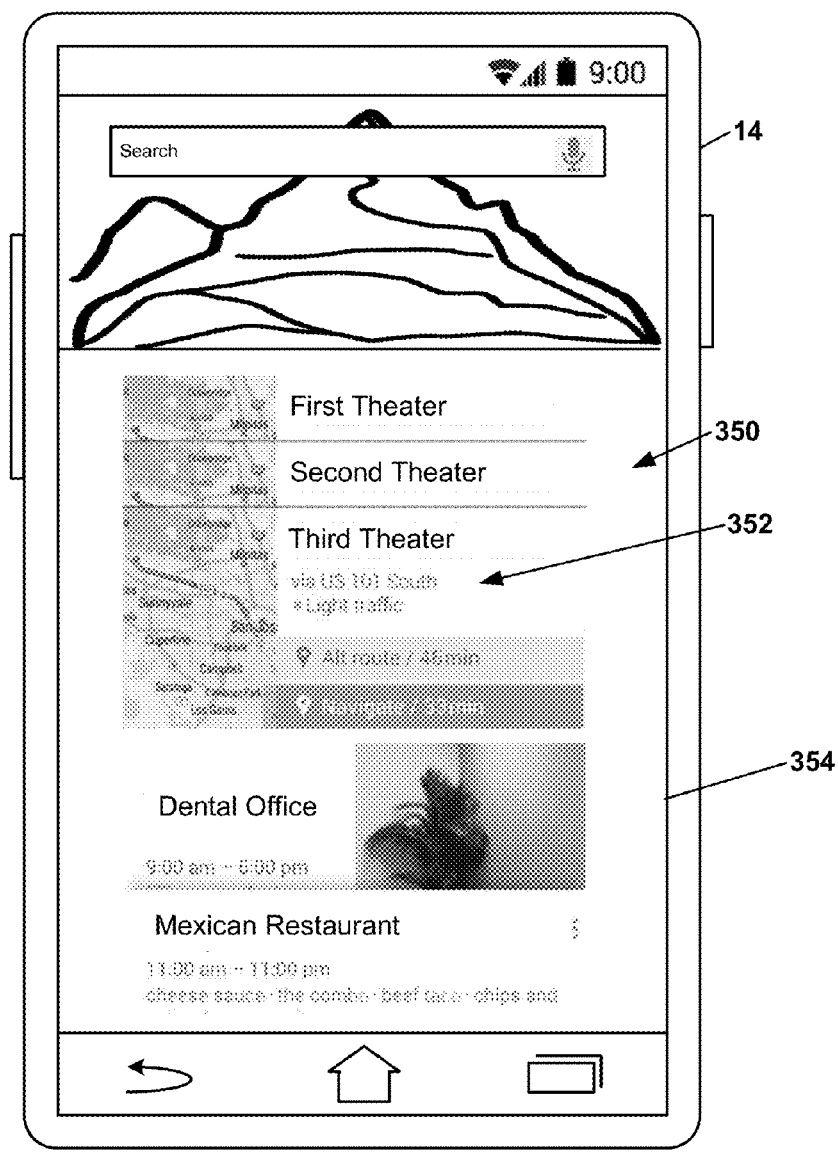
FIG. 9 is a conceptual diagram that illustrates an example user interface that displays information associated with a destination.

FIG. 9 is a conceptual diagram that illustrates an example user interface 350 that displays information 352 associated with a destination. In the example of FIG. 9, mobile computing device 14 outputs user interface 350 for display at a display device 352. In the example of FIG. 9, the information 352 includes information about the locations of and routes to theatres, dental offices, and a Mexican restaurant.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
receiving, by a mobile computing device, and prior to a particular time and date, information associated with a destination, wherein the mobile computing device receives the information from a remote computing system responsive to a determination, based at least in part on text parsed from one or more electronic messages associated with a user of the mobile computing device, that a probability of the user planning to depart for the destination at the particular time and date exceeds a threshold;
storing, by the mobile computing device, and prior to the particular time and date, the information associated with the destination in a memory of the mobile computing device; and
while the mobile computing device is at the destination and does not have network access:
maintaining, by the mobile computing device, an appearance of a first graphical element associated with a first application that, during execution, is able to use the information associated with the destination stored in the memory of the mobile computing device or is able to function properly while the mobile computing device does not have network access, and
modifying, by the mobile computing device, and appearance of a second graphical element associated with a second application that, during execution, is only able to function properly while the mobile computing device has network access.

2. The method of claim 1, further comprising:
receiving, by the mobile computing device, a directive from a server system, the directive instructing the mobile computing device to store the information associated with the destination.

3. The method of claim 1, wherein the mobile computing device downloads the information associated with the destination responsive to determining that the mobile computing device is able to download the information associated with the destination via an unmetered wireless channel.

4. The method of claim 1, further comprising:
while the mobile computing device is located at the destination:
retrieving, by the mobile computing device, the information associated with the destination from the memory of the mobile computing device; and
outputting, by the mobile computing device and for display, content that is based on the information associated with the destination.

5. The method of claim 4,
wherein the information associated with the destination includes a map of the destination, and
wherein outputting the content based on the information associated with the destination comprises outputting the map of the destination.

6. The method of claim 1, further comprising:
determining, by the mobile computing device, that the mobile computing device has departed from the destination; and
responsive to determining that the mobile computing device has departed from the destination, purging, by the mobile computing device, the information associated with the destination from the memory of the mobile computing device.

7. The method of claim 1,
parsing one or more electronic messages to identify text associated with travel, wherein the one or more electronic messages comprise content formatted to be readable by a human;
determining, based at least in part on the text parsed from the one or more electronic messages, the probability of the user of the mobile computing device planning to depart for the destination at the particular time and date; and
responsive to determining that the probability exceeds the threshold, extracting, based at least in part on the one or more electronic messages, travel plan information associated with the user, wherein the travel plan information indicates the destination, wherein extracting the travel plan information comprises:
identifying a relevant template from among a plurality of templates, wherein each template from the plurality of templates describes a respective format of messages associated with travel; and
parsing, based at least in part on the relevant template, the travel plan information from the one or more electronic messages,
wherein responsive to extracting the travel plan information, and prior to the particular time and date, the mobile computing device stores, at the memory of the mobile computing device, the information associated with the destination.

8. A method comprising:
parsing, by a computing system, one or more electronic messages to identify text associated with travel, wherein the one or more electronic messages comprise content formatted to be readable by a human;
determining, by the computing system and based at least in part on the text parsed from the one or more electronic messages, a probability of a user of a mobile computing device planning to depart for a destination at a particular time and date;
responsive to determining that the probability exceeds a threshold, extracting, by the computing system and based at least in part on the one or more electronic messages, travel plan information associated with the user, wherein the travel plan information indicates the destination; and
responsive to extracting the travel plan information, and prior to the particular time and date, sending, by the computing system to the mobile computing device, a directive for the mobile computing device to store, at a local memory of the mobile computing device, information associated with the destination,
wherein while the mobile computing device is at the destination and does not have network access, the mobile computing device:
maintains an appearance of a first graphical element associated with an application that, during execution, is able to use the information associated with the destination stored in the local memory of the mobile computing device or is able to function properly while the mobile computing device does not have network access, and
modifies an appearance of a second graphical element associated with an application that, during execution, is only able to function properly while the mobile computing device has network access.

9. The method of claim 8, wherein the directive comprises at least a portion of the information associated with the destination.

10. The method of claim 8, wherein the directive comprises executable instructions for storing the information associated with the destination.

11. The method of claim 8,
wherein the computing system sends the directive to the mobile computing device in response to receiving an indication from the user indicating that the mobile computing device is to store the information associated with the destination.

12. The method of claim 8, wherein the one or more electronic messages include one or more of: an email message, a short message service (SMS) text message, a social networking service post, and an instant message.

13. The method of claim 8,
wherein the one or more electronic messages comprise an email message,
wherein extracting the travel plan information comprises:
identifying, by the computing system, a relevant email template from among a plurality of email templates, each email template from the plurality of email templates describing a respective known format of email messages associated with travel, and
parsing, by the computing system, and based at least in part on the relevant email template, the travel plan information from the email message.

14. The method of claim 8, further comprising providing, by the computing system, a service that enables sending and receiving of the one or more electronic messages.

15. The method of claim 8, wherein the information associated with the destination includes one or more of: data associated with a map of the destination, data associated with traveler amenities at the destination, and data associated with turn-by-turn directions between particular locations at the destination.

16. The method of claim 8, wherein sending the directive to the mobile computing device comprises sending the directive to the mobile computing device in response to extracting the travel plan information and determining, based at least in part on a data access plan associated with the mobile computing device, to send the directive.

17. The method of claim 8, wherein extracting the travel plan information comprises extracting the travel plan information based at least in part on the one or more electronic messages and one or more items included in an electronic calendar associated with the user.

18. A computing system comprising:
a memory that stores instructions; and
one or more processors that execute the instructions, execution of the instructions configuring the computing system to:
receive one or more electronic messages comprising content formatted to be readable by a human;
parse the one or more electronic message to identify text associated with travel;
determine, based at least in part on the text parsed from the one or more electronic messages, a probability of a user of a mobile computing device planning to depart for a destination at a particular time and date;
responsive to determining that the probability exceeds a threshold, extract, from the one or more electronic messages, travel plan information associated with the user, the travel plan information indicating the destination and a date of departure to the destination; and
responsive to extracting the travel plan information, and prior to the particular time and date, send to the mobile computing device a directive for the mobile computing device to store, at a local memory of the mobile computing device, information associated with the destination,
wherein while the mobile computing device is at the destination and does not have network access, the mobile computing device:
maintains an appearance of a first graphical element associated with an application that, during execution, is able to use the information associated with the destination stored in the local memory of the mobile computing device or is able to function properly while the mobile computing device does not have network access, and
modifies an appearance of a second graphical element associated with an application that, during execution, is only able to function properly while the mobile computing device has network access.

19. The computing system of claim 18, wherein the directive comprises at least a portion of the information associated with the destination.

20. The computing system of claim 18, wherein the directive comprises executable instructions for storing the information associated with the destination.

21. The computing system of claim 18, wherein the computing system sends the directive to the mobile computing device in response to receiving an indication from the user indicating that the mobile computing device is to store the information associated with the destination.

22. The computing system of claim 18, wherein the one or more electronic messages include one or more of: an email message, a short message service (SMS) text message, a social networking service post, and an instant message.

23. The computing system of claim 18,
wherein the one or more electronic messages include an email message, and
wherein execution of the instructions by the one or more processors configuring the computing system to identify the relevant template from among the plurality of templates and to parse the travel plan information further configures the computing system to:
identify the relevant email template from among a plurality of email templates, each email template from the plurality of email templates describing a respective known format of email messages associated with travel; and
parse, based at least in part on the relevant email template, the travel plan information from the email message.

24. The computing system of claim 18, wherein execution of the instructions by the one or more processors configures the computing system to provide a service that enables sending and receiving of the one or more electronic messages.

25. The computing system of claim 18, wherein the information associated with the destination includes one or more of: data associated with a map of the destination, data associated with traveler amenities at the destination, and data associated with turn-by-turn directions between particular locations at the destination.

26. The computing system of claim 18, wherein execution of the instructions by the one or more processors configures the computing system to send the directive to the mobile computing device in response to extracting the travel plan information and determining, based at least in part on a data access plan associated with the mobile computing device, to send the directive.

27. The computing system of claim 18, wherein execution of the instructions by the one or more processors configures the computing system to extract the travel plan information based at least in part on the one or more electronic messages and one or more items included in an electronic calendar associated with the user.

28. A non-transitory computer-readable storage medium having instructions stored thereon that, when executed, cause a computing system to:

receive one or more electronic messages comprising content formatted to be readable by a human;

parse the one or more electronic messages to identify text associated with travel;

determine, based at least in part on the text parsed from the one or more electronic messages, a probability of a user of a mobile computing device planning to depart for a destination at a particular time and date;

responsive to determining that the probability exceeds a threshold, extract, from the one or more electronic messages, travel plan information associated with the user, the travel plan information indicating the destination and a date of departure to the destination, wherein extracting the travel plan information comprises:

identifying a relevant template from among a plurality of templates, wherein each template from the plurality of templates describes a respective format of messages associated with travel; and parsing, based at least in part on the relevant template, the travel plan information from the one or more electronic messages; and responsive to extracting the travel plan information, and prior to the particular time and date, send to the mobile computing device a directive for the mobile computing device to store, in a local memory of the mobile computing device, information associated with the destination, and wherein while the mobile computing device is at the destination and does not have network access, the mobile computing device:

maintains an appearance of a first graphical element associated with an application that, during execution, is able to use the information associated with the destination stored in the local memory of the mobile computing device or is able to function properly while the mobile computing device does not have network access, and modifies an appearance of a second graphical element associated with an application that is only able to function properly while the mobile computing device has network access.

\* \* \* \* \*